July 19, 1966  D. B. CHENOWETH ET AL  3,261,506
BEVERAGE DISPENSER
Filed Oct. 7, 1964  2 Sheets-Sheet 1
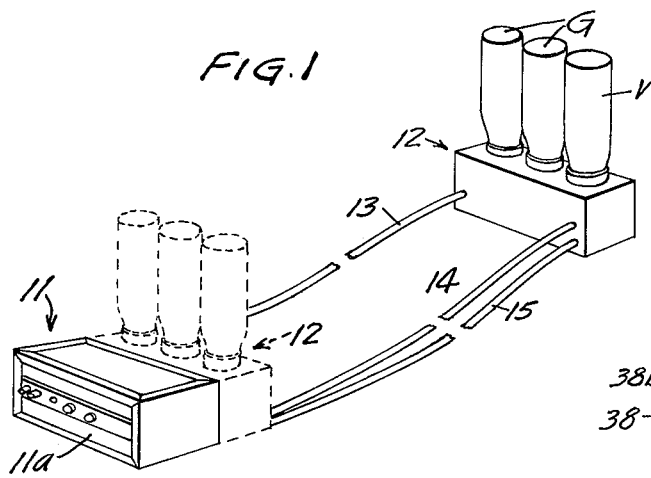
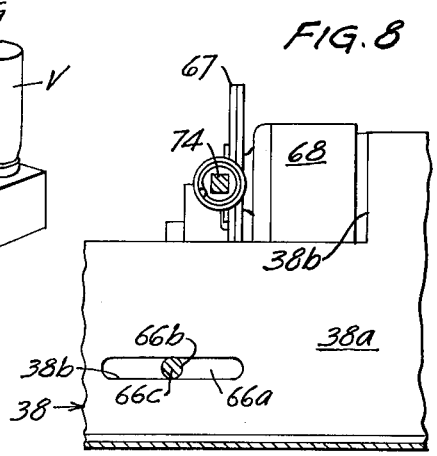
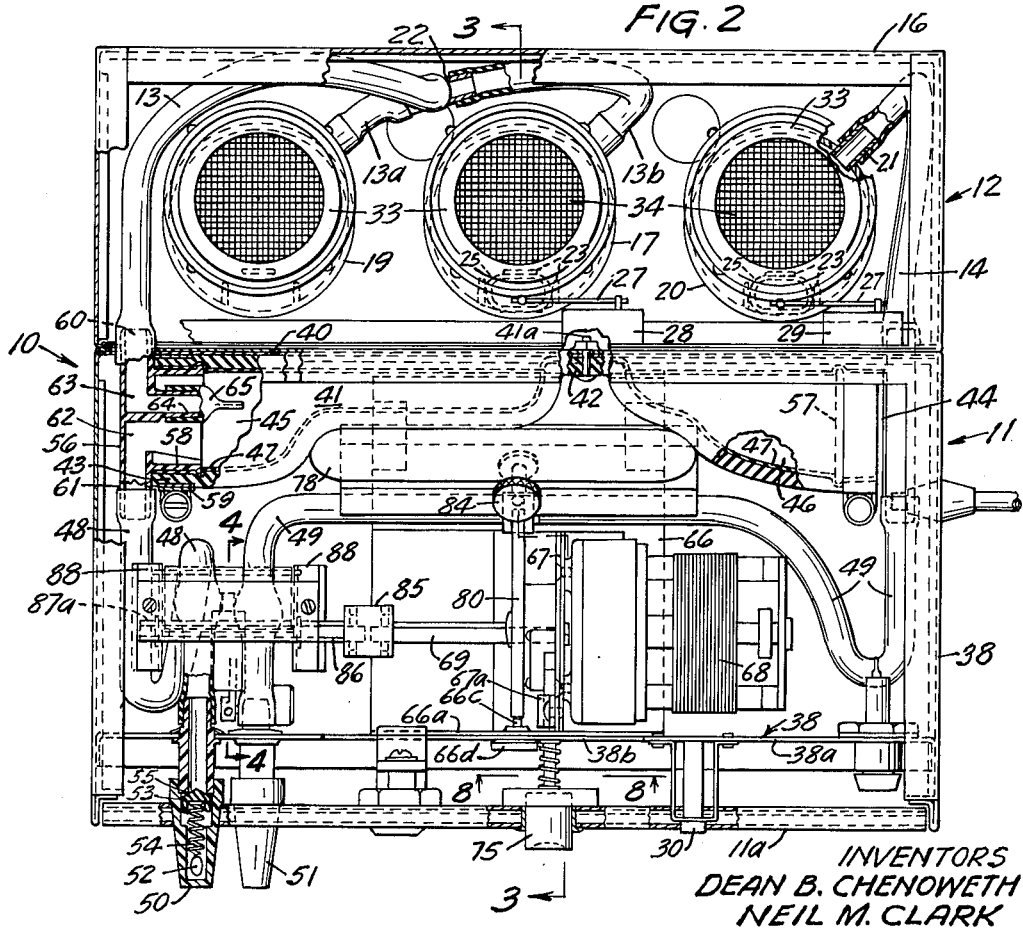
INVENTORS
DEAN B. CHENOWETH
NEIL M. CLARK
LOGAN W. JOHNSON
BY Williamson & Palmatier
ATTORNEYS

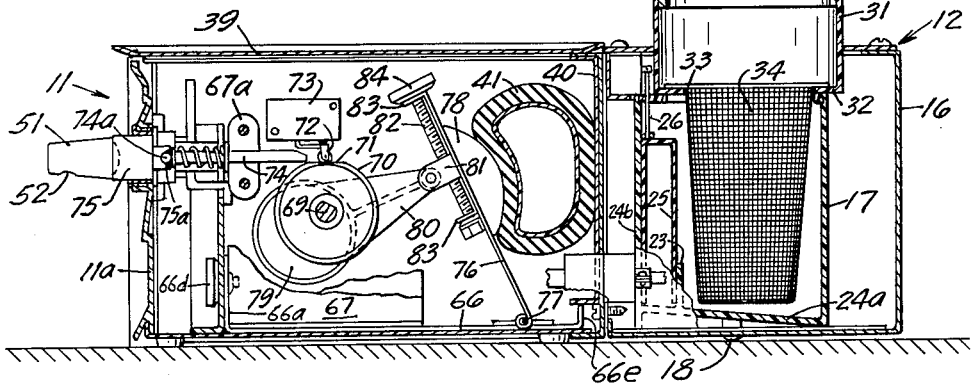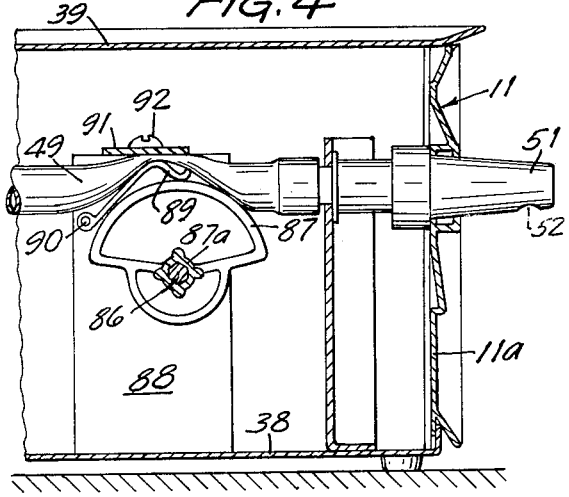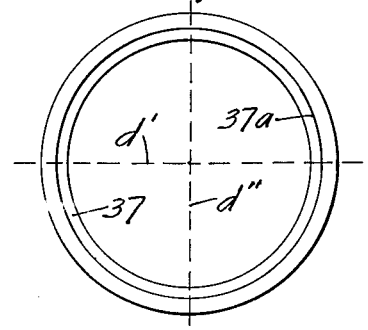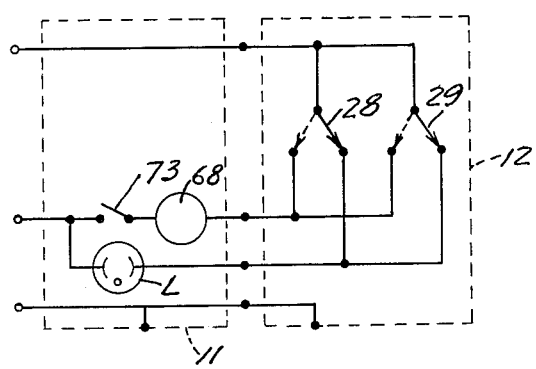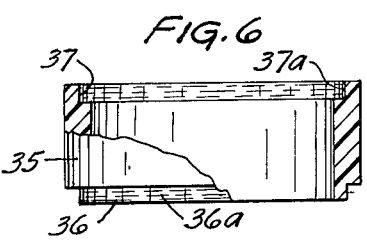

United States Patent Office 3,261,506
Patented July 19, 1966

3,261,506
BEVERAGE DISPENSER
Dean B. Chenoweth, Neil M. Clark, and Logan W. Johnson, Minneapolis, Minn., assignors to Gold Bond Stamp Company, Minneapolis, Minn., a corporation of Minnesota
Filed Oct. 7, 1964, Ser. No. 402,189
12 Claims. (Cl. 222—134)

This invention relates to a beverage dispenser and more particularly to an apparatus for measuring and dispensing predetermined quantities of different liquids for mixing into a beverage or drink.

An object of the invention is to provide a new and improved liquid measuring and dispensing mechanism of relatively simple and inexpensive construction and operation.

Another object of the invention is to provide a novel apparatus for dispensing beverages such as cocktails at one convenient location while the liquor bottles and source of supply of liquid are disposed at a remote location.

A further object of the invention is to provide an improved apparatus for simultaneously dispensing accurately measured quantities of the liquid components of a cocktail of desired size.

A still further object of the invention is to provide an improved apparatus for dispensing varying quantities of the liquid components of a cocktail, such as gin and vermouth in a carefully controlled condition after having been accurately measured so as to produce a cocktail of a predetermined size and strength.

Still another object of my invention is to provide a novel and improved apparatus for dispensing cocktails, the components of which may be varied relative to each other and proportionately, facilitating changing the strength and size of such cocktails.

These and other objects and advantages of the invention will more fully appear from the following description made in connection with the accompanying drawings wherein like reference characters refer to similar parts throughout the several views and in which:

FIG. 1 is a perspective view of the invention and illustrating the supply unit disposed at a location remote from the despensing unit, and further illustrating in dotted lines, the supply unit disposed immediately adjacent the dispensing unit, substantially in the manner illustrated in FIGS. 2 and 3 of the drawings.

FIG. 2 is a top plan view of the apparatus with the top cover plate removed and with certain apparatus shown in section for clarity of detail.

FIG. 3 is a section view taken along a broken line as indicated substantially at 3—3 of FIG. 2.

FIG. 4 is a detail section view taken approximately at 4—4 in FIG. 2.

FIG. 5 is a top plan view of one of the bottle supporting extension rings of FIG. 6.

FIG. 6 is an elevation view, partly in section, of the bottle supporting extension ring of FIG. 5.

FIG. 7 is a circuit diagram of the invention.

FIG. 8 is an enlarged detail section view taken at 8—8 of FIG. 2.

One form of the invention is shown in the drawings and is described herein. The dispensing apparatus is indicated in general by numeral 10 and includes a dispensing unit, indicated in general by numeral 11 and a supply unit indicated in general by numeral 12. The dispensing unit 11 may, if desired, be disposed immediately adjacent and actually fastened to the supply unit 12, if desired, as illustrated in FIGS. 2 and 3 of the drawings, or the dispensing unit 11 may be disposed remotely from the supply unit and connected thereto by hoses 13 and 14 and an electrical cable 15 containing multiple conductors, substantially as illustrated in FIG. 1. It will be understood therefore that when the apparatus is employed by a bartender or in a catering service, the dispensing unit 11 may be conveniently on or immediately adjacent to a serving counter or bar at which location the cocktails such as martinis are being served, while the supply unit containing bottles of gin and vermouth providing an appropriate supply of liquor for the cocktails is disposed at a remote location such as below the counter or on an auxiliary counter or cabinet, behind or next to the serving counter. As will be hereinafter pointed out and explained, the supply unit 12 need have no particular location relative to the dispensing unit 11 and may be disposed either above or below the dispensing unit or on approximately the same elevation. But of course, the supply unit 12 will be at a location convenient to the bartender or other persons serving the cocktails so that the bottles of liquor may be readily and easily changed as needed.

The supply unit 12 has a supporting structure which also provides a housing 16. A reservoir receptacle 17 is secured within the housing 16 as by a screw 18 for containing a quantity of one of the liquids being dispensed. A second identical reservoir receptacle 19 is similarly secured within the housing 16 to supply the identical liquid which is to be contained in reservoir receptacle 17. A third reservoir receptacle 20 is similarly secured within the housing 16 for containing and providing a source of supply of a different liquid for the beverage. In the form illustrated, it is contemplated that reservoir receptacles 17 and 19 will contain gin and the reservoir receptacle 20 will contain vermouth, for martinis. It will be noted that each of the reservoir receptacles is identical and has an outlet nipple 21 through which the liquid is supplied. The outlet nipple of reservoir receptacle 20 is connected to hose 14 through which the vermouth is supplied to the dispenser unit 11. The outlets from reservoir receptacles 19 and 17 are connected to short lengths 13a and 13b of hose which are connected by a T-fitting 22 to the hose 13 which supplies the gin from both of the reservoir receptacles 17 and 19 to the dispenser unit 11. Each of the reservoir receptacles is provided with upright float guides 23 formed integrally of the bottom and front walls 24a and 24b respectively of each of the reservoir receptacles. Reservoir receptacles 17 and 20 are provided with floats 25 therein and guided by the float guides 23 so as to sense the level of liquid therein. The floats 25 have stems 26 extending upwardly therefrom and connected to the operating arms 27 of switches 28 and 29 which, as seen in FIG. 7 are single pole, double throw switches. The detail functioning of these switches will be described hereinafter, but it should be presently noted that the floats 25 together with the switches indicate at the front panel 11a, of the dispensing unit, and by means of a warning light L, that one of the reservoir receptacles is very nearly empty so that the bartender or operator of the dispenser will be reminded to supply additional liquid to the proper receptacle.

Each of the reservoir receptacles has a bottle supporting ring 31 on the top thereof and provided with an inturned lower flange 32 upon which the rim 33 of a strainer 34 is supported. The upper edge of the ring 31 may be utilized to support an inverted bottle with a diminished neck of the bottle extending downwardly into the center of strainer 34. It will be seen that this manner of supporting the bottle on the reservoir receptacle facilitates ready and easy changing of bottles. It is recognized that bottles may have necks of various lengths, and in order to conveniently accommodate bottles of various neck lengths, a number of extension rings 35 are provided to fit upon ring 31 and upon each other. Such extension rings are illustrated in detail in FIGS. 5 and 6.

The extension rings 35 are constructed so as to interfit with each other at their end projections 36 and recesses 37 so as to normally resist separation from each other. The cylindrical ring 35 has the recess 37 formed in a slightly oblong shape so that the diameter of the recess 37 along a diametric line $d'$ exceeds the diameter along diametric line $d''$ by a small amount such as 0.010 inch. In addition, the cylindrical surface 37a of the recess 37 is provided with tool marks left during the turning operation.

Similarly, the end projection 36 is formed slightly oblong with dimensional variations similar to that of the recess.

In the extension rings 35 illustrated, the material is clear acrylic. The slightly oblong shapes of the recesses and end projections are formed by squeezing the cylindrical ring 35 slightly out of round by two jaws of a four jaw chuck, and while so held turning the recesses and projections and leaving tool marks on the cylindrical surfaces 36a and 37a. Therefore when the ring 35 is allowed to spring back to cylindrical shape, the recess 37 and projection 36 have a slightly oblong shape. Therefore when the end projection 36 of one extension ring is assembled with the recess of another extension ring, a slight rotation of one extension ring with respect to the other produces an interlocking between the extension rings which makes separation of the rings very difficult until the rings are again rotated relative to each other.

The dispenser unit 11 is provided with a frame 38 which comprises a housing with an open top which is normally closed by removable tray-shaped cover 39. The dispensing unit 11 is provided with an upright mounting panel 40 affixed to the rear portion of the frame 38. An elongate tube-like bladder member 41 lies against the upright mounting panel 40 and is retained thereagainst by a bolt fastener 41a. The bladder member 41 is formed of a length of polyvinyl chloride surgical tubing with heavy walls so as to be highly resilient. The medial portion 42 of the bladder member is flattened and heat sealed to prevent liquid flow communication between the opposite ends 43 and 44 of the bladder member and to thereby define liquid confining chambers adjacent the opposite ends and designated 45 and 46. It will be noted that the medial portion 42, which is flattened and heat sealed, is closer to end 44 than to end 43 and therefore chamber 45 is longer and larger than chamber 46. Each of the chambers 45 and 46 is provided with liners 47 of sheet material such as polyethylene.

Liquid is supplied to the chambers 45 and 46 through hoses 13 and 14, and liquid is discharged or dispensed from the chambers 45 and 46 through hoses 48 and 49, respectively. The discharge ends of hoses 48 and 49 are respectively connected to dispensing nozzles 50 and 51 which are identical with each other so that a understanding of one nozzle will suffice for an understanding of both. The nozzle 50, as shown in section and has a downwardly directed liquid discharging opening 52, and a check valve element 53 urged by spring 54 against a valve seat 55 so as to close the end of the outlet passage provided by the discharge hoses and the nozzles when flow of liquid therethrough is stopped. It will be noted that the nozzles 50 and 51 project from and are mounted on the front panel 11a of the dispenser.

Hoses 13 and 14, outlet hoses or conduits 48 and 49, as well as nozzles 50 and 51 cooperate to provide flow confining means related to the ends of each of the chambers 45 and 46. Such flow confining means additionally include end closures 56 and 57 which are identical to each other and are disposed at the opposite ends of the bladder member 41, to provide for connecting the several hoses or conduits to the chambers 45 and 46. The end closures 56 and 57 are identical with each other and an understanding of one will suffice for an understanding of both. End closure member 56 has a boss 58 projecting into the end 43 of bladder 41 which is clamped to the boss 58 by a hose clamp 59 encompassing the end 43 of the bladder. Closure 56 has oppositely extending hose receiving nipples 60 and 61 to which the inlet hose 13 and outlet hose 48 are respectively applied. Enclosure member 56 defines an outlet passageway 62 communicating with the nipple 61 and also with the open interior of chamber 45. The closure member 56 also defines an inlet passageway 63 which communicates between the nipple 60 and an additional nipple 64 which projects inwardly toward chamber 45 and mounts a rubber tongue or check valve 65 thereon which permits liquid flow from hose 13 into chamber 45 but prevents liquid flow in the opposite direction.

The dispenser unit 11 has a bottom frame plate 66 upon which is mounted an upright rigid frame panel 67 which carries an electric motor 68 having a drive shaft 69 drivably connected with a switch operating cam 70 having flat surface area 71 thereon which is normally engaged by the cam follower 72 of switch 73 for operating the switch when the cam 70 is revolved, or when the manually operated T-shaped rod actuator 74, which is aligned with the cam follower 72 is operated by the push button 75 projecting from the front panel 11a of the dispenser unit. The push button 75 has an elongate transverse operating bar at the inner side of the front trim panel 11a and grooved at 75a to slidably receive the elongate cross head 74a of the T-shaped rod actuator 74. A slide bearing 67a mounts the rod actuator on upright frame panel 67.

The frame plate 66 also hingedly mounts an upright swingable panel 76 by means of a pivot pin 77 and which carries a pressure applying member 78 confronting the bladder member 41. It will be seen that the pressure applying member 78 engages the bladder member adjacent both of the chambers 45 and 46 and bridges across the medial portion 42 so that when the mounting member 76 and pressure applying member 78 swing against the bladder member 41, liquid is expelled from both ends of the bladder. The upright mounting member 76 is connected to an eccentric cam 79 on the driving shaft 69 of the motor by connecting link 80 which encompasses the circular cam 79 and which is connected to a clevis 81 which is threadably mounted on an adjustment screw 82, the opposite ends of which are journaled in lips or flanges 83 formed integrally of mounting member 76. The upper end of screw 82 has a knob 84 for turning the screw and for adjusting the position of clevis 81 along the screw and thereby adjusting the point of connection between the connecting link 80 and the mounting member 76, in a direction toward and away from the pivot pin 77. The magnitude of swinging movement of pressure applying member 78 may be changed by adjusting or turning knob 84 so as to vary the amount of liquids expelled from the chambers 45 and 46 in a single cycle of operation, which consists in one complete rotation of shaft 69 and cam 70.

The bottom frame plate 66 has an upturned front flange 66a having a threaded aperture 66b therein threadably receiving the thumb screw 66c having a knurled head 66d. The upright front flange 66a of the frame plate 66 lies flush against the front upright panel 38a of the frame 38 which has an elongate horizontal slot 38b therein receiving the thumb screw 66c therethrough. The thumb screw 66c may be loosened to loosen the bottom frame plate 66 and permit sliding of the bottom frame plate in a direction parallel to the shaft 69, along with motor 68 and pressure applying member 78, to thereby change the relationship of the pressure applying member 78 to the bladder 41. This results in changing the relative amounts of liquid expelled from the chambers 45 and 46 when the pressure applying member 78 is operated so that the proportions of the components of the resultant beverage are changed. It will be seen that because of the shape and size of the opposite ends of the bladder 41, a movement of the pressure applying member 78 to the right as viewed in FIG. 2, will cause a greater amount of vermouth to be expelled from the chamber 46, and a slightly lesser amount of gin to be expelled from chamber 45, thereby making the resultant martini less dry.

As the motor 68, frame plate 66 and pressure applying member 78 are adjusted along the front flange 38a of the frame, the rod actuator 74 is also similarly moved and the transverse cross head 74a thereof moves along the groove 75a of the push button 75. It will be seen that the front panel 38a of the frame is suitably notched at 38b as to accommodate movement of the rod actuator 74 as required.

The rear portion of bottom frame plate 66 also has an upturned lip 66e, the upper edge of which confronts the rigid guide flange of the plate 40. The bottom frame plate 66 is thereby rigidly held down on the frame 38 so that only one thumb screw 66c is necessary for holding the bottom frame plate 66, pressure applying member 78 and motor 68 in a desired position.

The shaft 69 is connected by a coupling 85 to the hexagonal driving shaft 86 which revolves a valve operating cam 87 having shaft-receiving bushings 87a journaled on a valve frame 88 affixed to the frame 38 of the dispensing unit. The cam 87 bears upwardly against a hose pinching and cam following element 89 swingably mounted at its ends on the valve frame 88 by pivots 90. The dispensing hoses 48 and 49 overlie the swingable pinching element 89 and underlie the anvil plate 91 which is affixed as by screws 92 to the valve frame. The bushings permit longitudinal movement or adjustment of the hexagonal shaft 86 as the frame plate 66, pressure applying member 78 and motor 68 are moved along the frame.

As the pressure applying member 78 is moved against the bladder member, by rotation of shaft 69, the cam 87 permits the hose pinching element 89 to swing downwardly and to open the dispensing hoses 48 and 49 for discharging of liquids through the nozzles. Because the hoses are again immediately pinched off, the flow of liquid at the nozzles is immediately stopped when the desired quantity of liquid has been dispensed.

The pressure applying member 78 continuously maintains the bladder member in deformed condition, as shown, so as to maintain the bladder member against the mounting panel 40 and as to continuously maintain the yieldable bladder in partially flexed condition so as to maximize the utilization of the resilience thereof in drawing additional supplies of liquid from reservoirs.

In the normal operation of the liquid dispenser, bottles of gin G are mounted in inverted position above the receptacle and in communication with receptacles 17 and 19 and a bottle V of vermouth is carried by receptacle 20. A quantity of gin in the bottom of receptacles 17 and 19 and a quantity of vermouth in the bottom of receptacle 20 will normally effect floatation of the floats 25, and the switches 28 and 29 will be shifted to their alternate positions as illustrated in dotted lines in FIG. 7 so as to de-energize the light L and prepare the motor 68 for subsequent starting.

When the push button 75 is pressed cam follower 72 is moved to close switch 73 which starts the motor 68. The push button 75 may be instantly released because the cam 70 will retain the switch 73 closed during the single revolution of the cam 70.

Rotation of the motor shaft 69 effects rotation of the cam 79 and the cam 87, the latter of which permits liquid flow through the hoses 48 and 49. Rotation of cam 79 effects swinging of the pressure applying member 78 to squeeze the bladder 41 and cause gin to be expelled from the chamber 45 and vermouth to be expelled from the chamber 46, and these several liquids are thereby expelled from nozzles 50 and 51.

After the shaft 69 has rotated shaft 86 and cam 87 through approximately half a revolution, the hoses 48 and 49 are again pinched closed. Half a revolution of shaft 69 completes the pressing of bladder 41, and thereafter, continued rotation of the cam 79 effects rearward swinging of the mounting plate 76 and pressure applying member 78 so as to allow the resilient bladder 41 to again expand toward its normal shape. It will be understood that because of the positioning of the pressure applying member 78 and the length of stroke and the magnitude of swinging of mounting plate 76 in both directions, the bladder 41 is never allowed to completely return to fully relaxed position. This relationship contributes materially to the accuracy of measurement and the amount of liquids expelled from the chambers 45 and 46.

It will be understood that when the resilient bladder 41 is allowed to expand at its opposite ends the hoses 48 and 49 are pinched shut so as to prevent drawing of liquid from the hoses 48 and 49 and into the chambers 45 and 46 and the liquids are therefore drawn through the hoses 13 and 14 from the associated reservoirs.

When the cam 70 has completed a revolution, the cam follower 72 engages the flat 71 on the cam 70, thus causing switch 73 to open, which stops the motor 68.

A cocktail of predetermined quantity will have been dispensed through the nozzles 50 and 51 into a container or cocktail glass placed beneath the nozzles 50 and 51.

By adjusting the knurled knob 84 and turning screw 82, the clevis 81 is adjusted to change the magnitude of swinging of mounting plate 76 and pressure applying member 78 which effects a change in the quantity of liquids expelled from the chambers 45 and 46 during each cycle of operation.

It will therefore be seen that as a result of a single push button operation a cocktail of predetermined strength and of desired size is quickly dispensed. The supply unit 12 may be disposed immediately adjacent the dispensing unit 11 or may be remotely located. In the event that a quantity of liquids in the reservoirs reaches a low level, which necessitates changing of one of the bottles, one of the switches 28 or 29 will return to the position shown in FIG. 7 to cause illumination of the neon light L.

It will, of course, be understood that various changes may be made in the form, details, arrangement and proportions of the various parts without departing from the scope of our invention.

What we claim is:

1. Beverage dispensing apparatus,
    comprising a supply unit having a supporting structure,
       a pair of reservoirs on the structure and having outlets, each of the reservoirs having means supporting a supply bottle in inverted position and in flow communication with the respective reservoir,
    a dispensing unit separate from and adapted to be disposed remotely from said supply unit and having a frame, a pair of supply conduits each connected to the outlet of a respective reservoir of the supply unit,
       a pump having a pair of elongate liquid chambers each having an inlet connected to a respective conduit to be supplied from a respective reservoir thereby, said chambers each having an outlet, said pump having means drawing liquid into said chambers from said conduits and also forcing the liquid out through said outlets, and said dispensing unit also including nozzle means having flow communication with said outlets and receiving liquid forced from said chambers.

2. Apparatus for dispensing liquids for mixing into a beverage, comprising a frame,
    a bladder member consisting in a length of resiliently deformable tubing having opposite ends and a medial portion, said medial portion being flattened and sealed to completely close the interior of the tube and prevent liquid flow communication between said ends and to define first and second liquid confining chambers adjacent said ends, first and second flow confining means each connected with a respective end of said bladder member, each of said flow confining means including an inlet passage with a check valve therein permitting liquid flow through said inlet passage only toward the corresponding chamber of the bladder member, each of said flow confining means also including an outlet passage having valve means permitting fluid flow only outwardly from said chamber of the bladder member, means providing a pair of liquid sources and connected to the inlet passages of respective flow confining means for supplying liquid to said chambers from respective sources, means mounting said bladder member on the frame, an elongate pressure applying member confronting said bladder and extending therealong in both directions from said medial portion, and means movably mounting said pressure applying member on the frame for movement against said bladder member and simultaneously collapsing both chambers, thereby causing quantities of liquids to be expelled through said outlet passages, said pressure applying member also being movable oppositely to relieve pressure on the bladder and permit the bladder to resiliently distend again for drawing additional supplies of the liquids from said sources.

3. Beverage dispensing apparatus, comprising a frame, a bladder member consisting in a length of resiliently deformable tubing having opposite ends and a medial portion, said medial portion being flattened and sealed to completely close the interior of the tube and prevent liquid flow communication between said ends and to define first and second liquid confining chambers adjacent said ends, first and second flow confining means each connected with a respective end of said bladder member and supplying liquid to and discharging liquid from the respective liquid chamber, each of said first and second means including a closure member affixed to the respective ends of the tubing to close the corresponding chamber and each of said members having inlet and outlet openings, each of said flow confining means including an inlet valve means and a supply conduit connected with the inlet opening of the corresponding closure member and permitting only liquid inflow therethrough to the chamber, and said flow confining means including outlet valve means and dispensing conduits respectively connected with the outlet openings of said closure members and permitting only liquid outflow therethrough from the chambers, means providing a pair of liquid sources and connected to respective supply conduits, means mounting said bladder member on the frame, an elongate pressure-applying member adjacent said bladder and extending therealong in both directions from said medial portion, means movably mounting said pressure applying member on the frame for moving against said bladder for simultaneously collapsing both chambers and causing quantities of liquids to be expelled through said dispensing conduits, said pressure-applying member also being movable away from said bladder to permit the bladder to resiliently distend again for drawing additional supplies of the liquids from said sources.

4. The apparatus of claim 2 and including a pivot connecting said pressure applying member to the frame for swinging and pressure applying and relieving movement relative to said bladder, motor driven means producing swinging movement of said pressure applying member to thereby produce outward flow of liquid through said outlet passages and including an adjustable connection to said pressure applying member movable toward and away from said pivot, thereby facilitating adjustment of the swinging of said pressure applying member and of the quantity of liquids expelled through said outlet passages from said chambers.

5. Apparatus for dispensing liquids for mixing into a beverage, comprising a frame, a bladder member consisting in a length of resiliently deformable tubing having opposite ends and a medial portion, said medial portion being flattened and sealed to completely close the interior of the tube and prevent liquid flow communication between said ends and to define first and second liquid confining chambers adjacent said ends, first and second flow confining means each connected with a respective end of said bladder member, each of said flow confining means including an inlet passage with a check valve therein permitting liquid flow through said inlet passage only toward the corresponding chamber of the bladder member, each of said confining flow means also including an outlet passage having an outlet valve operable to open and close said outlet passage and thereby control dispensing through said passage of liquid from said chamber, said outlet valve having valve operating means operable independently of the fluid pressure within said outlet passage to cause stopping of fluid flow through said outlet passage regardless of fluid pressure in said outlet passage, after the desired amount of liquid has been dispensed, means providing a pair of liquid sources connected to the inlet passages of respective flow confining means for supplying liquids to said chambers from respective sources, means mounting said bladder member on the frame, an elongate pressure applying member confronting said bladder and extending therealong in both directions from said medial portion, and means movably mounting said pressure applying member on the frame for movement against said bladder and simultaneously collapsing both chambers thereby causing quantities of liquids to be expelled through said outlet passages, said pressure applying member also being movable oppositely to relieve pressure on the bladder and permit the bladder to resiliently distend again for drawing additional supplies of the liquids from said sources.

6. Apparatus for dispensing liquids for mixing into a beverage comprising a frame, a bladder member consisting in a length of resiliently deformable tubing having opposite ends and a medial portion, said medial portion being flattened and sealed to completely close the interior of the tube and prevent liquid flow communication between said ends and to define first and second liquid confining chambers adjacent said ends, means mounting said bladder on the frame, an elongate pressure applying member confronting said bladder and extending therealong in both directions from said medial portion, said pressure applying member continuously engaging and bearing against said bladder member, means on the frame mounting and permitting movement of said pressure applying member to and between first and second positions, the pressure applying member partially defining said tube and partially collapsing both of said chambers in said first position, and said pressure applying member additionally defining said bladder member and additionally collapsing both of said chambers in said second position, first and second flow confining means each connected with a respective end of said bladder member, each of said flow confining means including an inlet passage with a check valve therein permitting liquid flow through said inlet passage only toward the corresponding chamber of the bladder member, each of said flow confining means also including an outlet passage with an outlet valve operable to permit and prevent fluid flow outwardly from the chamber of the bladder member, said outlet valve having valve operating means operable independently of the fluid pressure in said outlet passage to stop fluid flow through said outlet passage, regardless of the fluid pressure in said outlet passage and said chamber, after the desired amount of liquid has been dispensed, whereby fluid flow through said out passage is controlled independently of movement of said pressure applying member and the continuously partially defined chambers of the bladder member.

7. Apparatus for dispensing liquids for mixing into a beverage, comprising a frame,
   a bladder member consisting in a long and resiliently deformable tubing having opposite ends and a medial portion, said medial portion being flattened and sealed to completely close the interior of the tube and prevent liquid flow communication between said ends and to define first and second liquid confining chambers adjacent said ends,
   first and second flow confining means each connected with a respective end of said bladder member, each of said flow confining means including an inlet passage with a check valve therein permitting liquid flow through said inlet passage only toward the corresponding chamber of the bladder member, each of said flow confining means also including an outlet passage having valve means controlling fluid flow outwardly from said chamber of the bladder member,
   means mounting said bladder member on the frame,
   an elongate pressure applying member confronting and continuously engaging said bladder and extending therealong in both directions from said medial portion,
   and means movably mounting and retaining said pressure applying member in and between first and second positions, said pressure applying member bearing firmly against said bladder and simultaneously partially collapsing both chambers while in said first position; said pressure applying member additionally defining said bladder member and additionally collapsing said chamber in said second position whereby to effect expelling of liquids from said chambers when said pressure applying member is moved from said first position to said second position, said bladder member resiliently distending as said pressure applying member is moved from said second position to said first position to thereby effect drawing of additional supplies of the liquids from said sources.

8. The liquid dispensing apparatus of claim 5 and including operating apparatus connected with said pressure applying member for moving said pressure applying member and producing collapsing and distending of said liquid chambers,
   and drive means drivably connected with said operating apparatus and with said outlet operating means to effect cooperatively expelling of liquids from said respective chambers and opening of said outlet valves to effect dispensing of said liquids.

9. Apparatus for dispensing liquids in predetermined quantities relative to each other,
   comprising a frame, a bladder mounting panel on said frame,
   a bladder member of generally tubular shape and highly resiliently deformable material, said bladder member having opposite ends and medial portion, said medial portion being flattened and sealed to completely close the open interior and prevent flow communication between the ends of the bladder member and to define first and second liquid chambers adjacent said ends, said bladder member having front and rear sides, first and second flow confining means each connected with a respective end of said bladder member, each of said flow confining means including an inlet passage with a check valve therein permitting fluid flow through said inlet passage only toward the corresponding chamber of the bladder member, each of said flow confining means also including an outlet passage having valve means permitting fluid flow only outwardly from said chamber of the bladder member,
   and additional means mounting and retaining the rear side of said bladder member against said bladder mounting panel and including means clamping said medial portion against said panel, said additional means, said additional means also including an elongate and substantially rigid pressure applying member confronting and continuously engaging the front side of said bladder member and extending therealong in both directions from said medial portion,
   means movably mounting and retaining said pressure applying member in and between first and second positions, said pressure applying member bearing against said bladder member and partially defining and collapsing both of said chambers while in said first position and also effecting engagement by the rear of said bladder member and partially defining and collapsing both of said chambers while in said first position and also effecting engagement by the rear of said bladder member substantially along the entire length thereof against said panel; the second position of said pressure applying member being disposed between said first position and said panel whereby to effect additional deformation of said bladder member and additional collapsing of both of the chambers thereof and thereby effect expelling of liquids from said chambers through said outlet passages,
   means alternately moving said pressure applying member to first and second positions to thereby effect alternate expelling of liquids from said chambers and drawing of liquids to the chambers from said sources.

10. Apparatus for dispensing liquids for mixing into a beverage,
    comprising a frame,
    a bladder member consisting in a length of resiliently deformable tubing having opposite ends and a medial portion, said medial portion being flattened and sealed to completely close the interior of the tube and prevent liquid flow communication between said ends and to define first and second liquid confining chambers adjacent said ends,
    first and second flow confining means each connected with a respective end of said bladder member, each of said flow confining means including an inlet passage with a check valve therein permitting liquid flow through said inlet passage only toward the corresponding chamber of the bladder member, each of said flow confining means also including an outlet passage having valve means permitting fluid flow only outwardly from said chamber of the bladder member,
    means providing a pair of liquid sources connected to the inlet passages of respective flow confining means for supplying liquid to said chambers from said respective sources,
    means mounting said bladder member on the frame,
    an elongate pressure applying member confronting said bladder and extending along predetermined lengths of the bladder in both directions from said medial portion for engagement therewith,
    and means movably mounting said pressure applying member on the frame for movement inwardly and outwardly of the bladder for sequentially applying and relieving bladder-deforming pressure and effecting expelling of liquids from said chambers and drawing additional supplies of the liquids from said sources, and said last mentioned means also mounting said pressure applying member for adjustable movement along the bladder to change the relative lengths of the bladder engaged by said pressure applying member and thereby changing the relative amounts of liquids expelled from said chambers under pressure applied from said pressure applying member.

11. Apparatus for dispensing liquids for mixing into a beverage, comprising a frame, a bladder member consisting in a length of resiliently deformable tubing having opposite ends and a medial portion, said medial portion being flattened and sealed to completely close the interior of the tube and prevent liquid flow communication between said ends and to define first and second liquid confining chambers adjacent said ends, one of said ends of the bladder tapering convergently toward said medial portion, first and second flow confining means each connected with a respective end of said bladder member, each of said flow confining means including an inlet passage with a check valve therein permitting liquid flow through said inlet passage only toward the corresponding chamber of the bladder member, each of said flow confining means also including an outlet passage having valve means permitting fluid flow only outwardly from said chamber of the bladder member, means providing a pair of liquid sources and connected to the inlet passages of said respective flow confining means for supplying liquid to said chambers from respective sources, means mounting said bladder member on the frame, an elongate pressure applying member confronting said bladder and extending in both directions from said medial portion through predetermined lengths of the bladder for engagement therewith, and means mounting said pressure applying member on the frame for movement inwardly and outwardly of the bladder for sequentially applying and relieving bladder-deforming pressure and effecting expelling of liquids from said chambers and drawing additional supplies of the liquids from said sources, and said last mentioned means also mounting said pressure applying member for adjustable movement along the bladder to change the relative lengths of the bladder engaged by said pressure applying member and to move the pressure applying member along said tapered end of the bladder to thereby change the relative proportions of liquids expelled from the bladder in response to deformation by said pressure applying member.

12. The liquid dispensing apparatus of claim 10 and including a pivot connecting said pressure applying member to the frame for swinging and pressure-applying and relieving movement relative to said bladder, and motor driven means producing swinging of said pressure applying member to thereby produce outward flow of liquid through said passages and including an adjustable connection to said pressure-applying member and movable toward and away from said pivot, thereby facilitating adjustment of the swinging of said pressure-applying member and of the quantity of liquid expelled through said outlet passages from said chambers.

References Cited by the Examiner

UNITED STATES PATENTS

| | | | |
|---|---|---|---|
| 2,022,951 | 12/1935 | Cohen | 222—136 X |
| 2,695,567 | 11/1954 | Harvey | 103—148 X |
| 2,849,159 | 8/1958 | Kaufman | 222—333 X |
| 2,919,053 | 12/1959 | Briggs | 222—134 X |
| 3,028,051 | 4/1962 | Jacobs | 222—134 X |
| 3,046,903 | 7/1962 | Jones | 103—149 |
| 3,094,247 | 6/1963 | Marchi | 222—136 X |

RAPHAEL M. LUPO, *Primary Examiner.*